United States Patent [19]
McCarty et al.

[11] Patent Number: 5,954,796
[45] Date of Patent: Sep. 21, 1999

[54] SYSTEM AND METHOD FOR AUTOMATICALLY AND DYNAMICALLY CHANGING AN ADDRESS ASSOCIATED WITH A DEVICE DISPOSED IN A FIRE CHANNEL ENVIRONMENT

[75] Inventors: James F. McCarty, Spring; Richard D. Gunlock, Houston; Michael E. McGowen, Spring, all of Tex.

[73] Assignee: Compaq Computer Corporation, Houston, Tex.

[21] Appl. No.: 08/798,962

[22] Filed: Feb. 11, 1997

[51] Int. Cl.$^6$ ........................................... G06F 9/00
[52] U.S. Cl. .................. 709/222; 709/227; 709/250; 709/251; 370/241; 370/242; 370/244; 370/401; 370/404; 370/475
[58] Field of Search .................. 395/200.81, 200.5, 395/200.51, 200.75; 370/241, 242, 244, 401, 404, 475; 709/220, 222, 221, 250, 251, 252, 227, 245

[56] References Cited

U.S. PATENT DOCUMENTS

| | | | |
|---|---|---|---|
| 5,003,508 | 3/1991 | Hall | 364/900 |
| 5,175,822 | 12/1992 | Dixon et al. | 395/275 |
| 5,237,660 | 8/1993 | Weber et al. | 395/250 |
| 5,313,323 | 5/1994 | Patel | 359/115 |
| 5,421,024 | 5/1995 | Faulk et al. | 395/800.23 |
| 5,471,639 | 11/1995 | Harrington | 395/842 |
| 5,535,035 | 7/1996 | DeFoster et al. | 359/161 |
| 5,544,326 | 8/1996 | Pease et al. | 395/250 |
| 5,546,550 | 8/1996 | Carter | 395/309 |
| 5,638,518 | 6/1997 | Malladi | 395/200.21 |
| 5,727,218 | 3/1998 | Hotchkin | 395/733 |
| 5,751,715 | 5/1998 | Chan et al. | 370/455 |
| 5,754,549 | 5/1998 | DeFoster et al. | 370/405 |
| 5,812,754 | 9/1998 | Lui et al. | 395/182.04 |

OTHER PUBLICATIONS

"Ultra SCSI White Paper"; *Quantum*; Nov. 25, 1996; http://www.quantum.com/products/whitepapers/ultraSCSI.html; pp. 1–7.

"Fibre Channel for the Long Run"; Newsletter; *Interphase ICON—Technical news*; Nov. 25, 1996; http://www.iphase.com/Public/Events/ICON/Fall/Tech_News.html; pp. 1–3.

"Fibre Channel Loop Community" Newletter; Nov. 26, 1996; http://www.symbios.com/fclc/fc21cen.html; pp. 1–7.

Frymoyer, Edward J.; "Fibre Channel Fusion: Low Latency, High Speed"; *Hewlett–Packard Co.*, Feb. 1995; http://www.data.com/Tutorials/Fibre_Channel_Fusion.html; Nov. 25, 1996; pp. 1–9.

"Why Fibre Channel, why ATM? Competitors or Complementary?"; *Ancot*; Nov. 26, 1996; http://www.anco.com/modiscuss.html; pp. 1–3.

Sutton, Tim and Webb, David; "Fibre Channel: The Digital Highway Made Practical"; *Seagate,* Oct. 22, 1994; http://www.maxcom.nl/seagate/wpaper/fibrchan.html; Nov. 25, 1996; pp. 1–7.

Goralski, Walter and Kessler, Gary; "Fibre Channel: Standard, Applications, and Products"; Dec. 1995; http://www.hill.com/personnel/gck/fibre channel.html; Nov. 25, 1996; pp. 1–8.

(List continued on next page.)

*Primary Examiner*—Meng-Ai T. An
*Assistant Examiner*—Dzung Nguyen
*Attorney, Agent, or Firm*—Jenkens & Gilchrist P.C.

[57] ABSTRACT

A computer system with a plurality of devices compatible with the Fibre Channel Protocol, which computer system is provided with the capability to dynamically alter the configuration of the plurality of devices without a system reset, or without additional software overhead. This capability is realized by providing unique mapping relationships between low-level Fibre Channel information structures related to the devices and upper-level link elements compatible with an Operating System associated with the computer system.

13 Claims, 7 Drawing Sheets

OTHER PUBLICATIONS

"Input/Output Buses"; Nov. 25, 1996; http://www.sanders.com/hpc/ArchGuide/Elements/Commune/IO.html; pp. 1–3.

"SCSI Description" Quantum Grand Prix SCSI Manual; Chapter 6–6.1; Nov. 26, 1996; http://www.quantum.com/products/manuals/gp–scsi–manual/chap6.1.html; pp. 1–2.

"SCSI Description" Quantum Grand Prix SCSI Manual; Chapter 6.2–6.2.1; Nov. 26, 1996; http://www.quantum.com/products/manuals/gp–scsi–manual/chap6.2.1.html; one page.

"SCSI Description" Quantum Grand Prix SCSI Manual; Chapter 6.2.2–6.2.3; Nov. 26, 1996; http://www.quantum.com/products/manuals/gp–scsi–manual/chap6.2.3.html#6; one page.

"SCSI Description" Quantum Grand Prix SCSI Manual; Chapter 6.2.4; Nov. 26, 1996; http://www.quantum.com/products/manuals/gp–scsi–manual/chap6.2.4.html; one page.

"Mapping SCSI to Fibre Channel"; *Emulex Fibre Channel Products;* Nov. 25, 1996; http://www.emulex.com/fc/scsi–mapping.html; pp. 1–2.

"Interphase Announces PCI Interface for HP's Tachyon Fibre Channel Controller Chip" News Release; *Interphase Corporation;* Nov. 25, 1996; http://www.iphase.com/Public/PressReleases/1996/TSI_PCI.html' pp. 1–2.

though not depicted in FIG. 1, the

SYSTEM AND METHOD FOR AUTOMATICALLY AND DYNAMICALLY CHANGING AN ADDRESS ASSOCIATED WITH A DEVICE DISPOSED IN A FIRE CHANNEL ENVIRONMENT

BACKGROUND OF THE INVENTION

1. Technical Field of the Invention

The present invention relates to channel and network communication systems and processes and, in particular, to a system and method for automatic dynamic loop address changing in a Fibre Channel environment.

2. Description of Related Art

There are two kinds of protocols for device communication: channels and networks. Channels, for example, between a master host computer and a slave peripheral device, transport a large amount of data at very high speeds over relatively small distances with little software overhead once data transmission commences. A channel provides a direct or switched point-to-point connection between a master and a slave that is hardware-intensive. Networks, on the other hand, usually interface many users and support many transactions, sharing a plurality of hosts and system resources, over medium to large distances. In network connections higher software overhead is generally acceptable as long as high connectivity is achieved.

The Fibre Channel Protocol ("FCP") is a new generation protocol that combines the best of these two disparate methods of communication in a single Open-Systems-Interface-like (OSI-like) stack architecture. Essentially, the Fibre Channel ("FC") is a multi-topology, multi-layer stack with lower-layer-protocols ("LLPs") for controlling the physical transport characteristics and upper-layer-protocols ("ULPs") for mapping LLP communication to and from higher-level software structures that are compatible with an Operating System. These ULPs include both channel and network protocols such as Intelligent Peripheral Interface ("IPI"), Small Computer System Interface ("SCSI"), and Internet Protocol ("IP"), among others.

One of the most desirable objectives in any multi-device communication system is the ability to "hot-plug," that is, the capability to delete, add, and/or substitute a device in a system without bringing the system down or incurring an inordinate amount of specialized software overhead. For example, in a master-slave channel communication system, it is extremely useful to be able to change the attached peripheral devices on the fly without having to re-boot the system or without erecting expensive software partitions between the Operating System and the protocol that is associated with the multi-device communication system.

Although the ULPs in the FCP stack offer the benefits of multi-protocol connectivity to both channel and network communication systems, they do not provide for the capability to dynamically alter the device configuration of the system without the aforementioned shortcomings. Moreover, many Operating Systems currently in use do not provide for structures that would facilitate dynamic reconfiguration of the devices disposed in an FC environment. Accordingly, it can be appreciated that because of the tremendous growth potential for FC-compatible computer systems, there is a manifest need for providing a cost-effective solution that ameliorates these and other drawbacks.

SUMMARY OF THE INVENTION

The present invention overcomes the above-identified problems as well as other shortcomings and deficiencies of existing technologies by providing; for a computer system operable with an Operating System (OS), the computer system having a Fibre Channel (FC) communication environment, which environment includes a plurality of FC devices, at least one of the FC devices being an initiator; a method for dynamically controlling the configuration of the plurality of FC devices, which method comprises the steps of: determining an FC-specific information structure related to each of the plurality of FC devices; associating the FC-specific information structure for each of the plurality of FC devices with a logical link element compatible with the Operating System, the associating step being effectuated by association means; and updating the association means responsive to a reconfiguration of the FC environment.

The present invention further provides a system for dynamically controlling the configuration of a multi-device FC communication environment, the system comprising: means for determining an FC-specific information structure related to each of the plurality of FC devices; means for associating the FC-specific information structure for each of the plurality of FC devices with a logical link element compatible with the Operating System of a computer system; and means for updating the associating means responsive to a reconfiguration of the FC environment.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
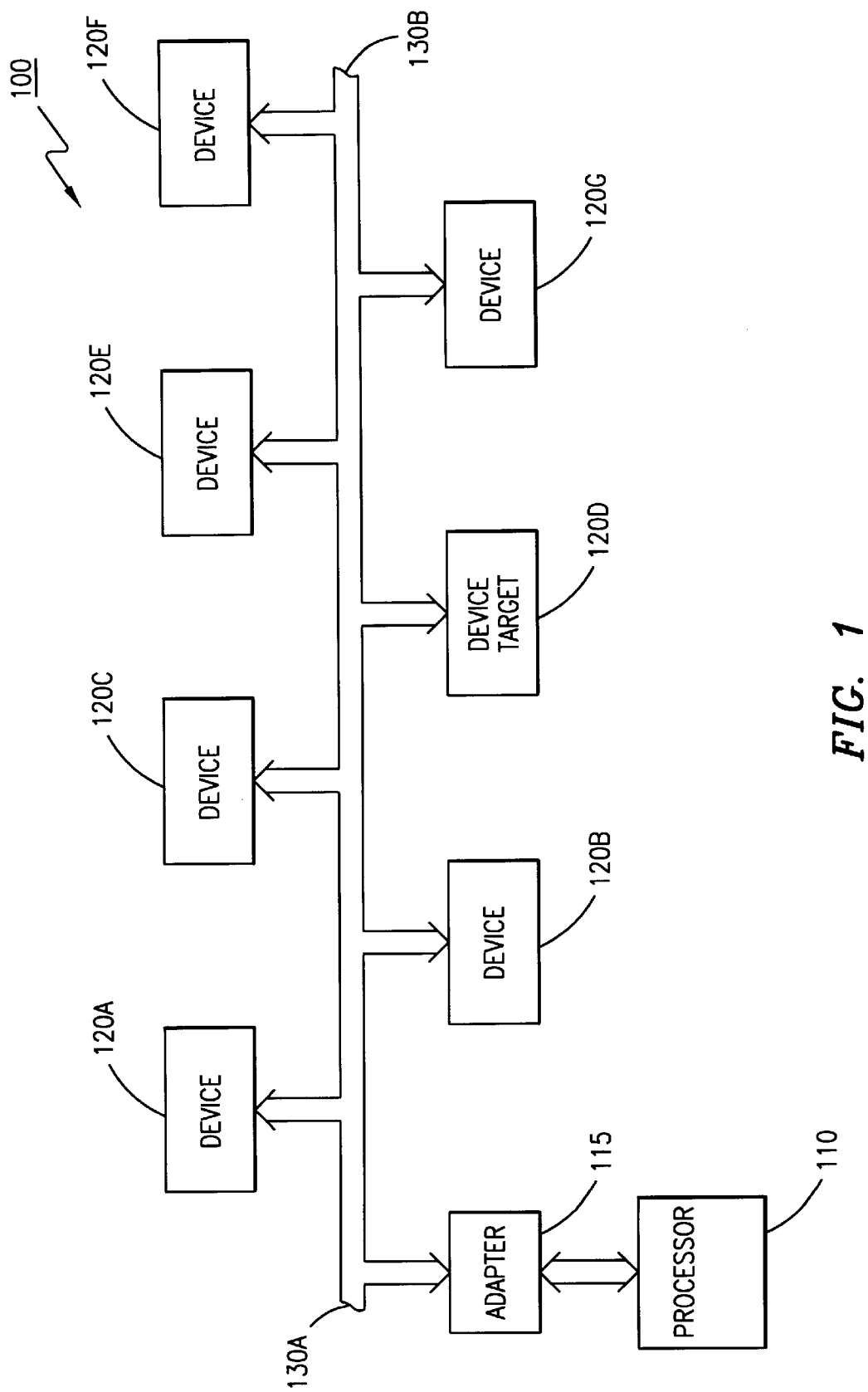
FIG. 1 illustrates a block diagram of a prior art channel communication system, more particularly, a system operable with a SCSI standard.

Referring now to the drawings wherein like or similar elements are designated with identical reference numerals throughout the several views, and wherein the various elements depicted are not necessarily drawn to scale, and, in particular, to FIG. 1, there is shown a block diagram of a prior art channel communication system, generally at 100, such as a channel system operable with the Small Computer System Interface ("SCSI") protocol. A processor 110 is provided with a SCSI adapter 115 in order to effectuate channel communication via a SCSI bus 125 to which a plurality of peripheral devices, for example, SCSI devices 120A–120G, are connected. It can be appreciated by those skilled in the art that although not depicted in FIG. 1, the ends 130A and 130B of the SCSI bus 125 may each contain an appropriate termination element, respectively.

As is well-known in the art, a SCSI device can be either an initiator or a target and the SCSI bus 125 can include any combination thereof provided at least one initiator and one target are present. For example, the processor 110, through its adapter 115, may function as the initiator and the device 120D may function as a target in the channel communication system 100. Certain specific functions are assigned to either an initiator or a target: (i) an initiator can arbitrate for the bus 125 and select a target; (ii) a target can request the transfer of command, data, status, or other information to or from the initiator, and (iii) in some instances, a target can arbitrate for the bus 125 and reselect an initiator to continue a bus transaction.

Continuing to refer to FIG. 1, the target 120D may support from one to eight physical or virtual devices called "logical units." A complete device address consists of the SCSI identity ("ID") of the target and the Logical Unit Number ("LUN") of the device. A physical device that does not support additional logical units such as for example, a conventional SCSI hard disk drive, comprises only one logical unit in which case the LUN is set to zero.

In a SCSI environment, a bus transaction is defined by the SCSI command protocol as an input/output ("I/O") process. An I/O process begins with the establishment of a logical link called a "nexus," which defines the logical path between an initiator and a target such as a conventional SCSI hard disk drive, represented by the SCSI ID of the initiator ("I") and the SCSI ID of the drive ("T"). As is understood in the art, the nexus may be further refined by using the IDENTIFY message of the SCSI command protocol to include a LUN if applicable. In this case, the complete logical link will be I_T_LUN. It should be understood that the I_T_LUN logical link is sometimes interchangeably referred to as the BUS_TARGET_LUN or B_T_LUN also.

Figure 2:
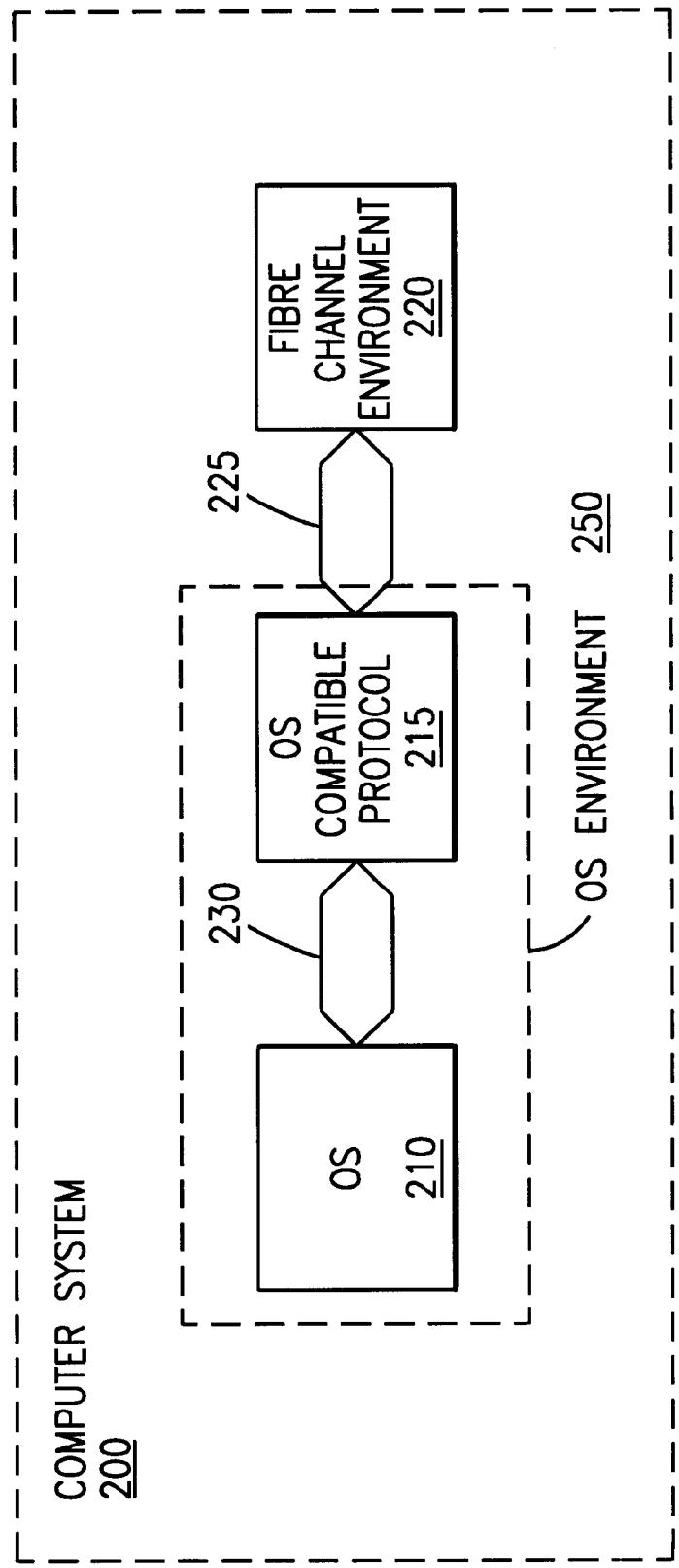
FIG. 2 illustrates a block diagram of an exemplary computer system wherein the teachings of the present invention may be practiced.

Referring now to FIG. 2, a block diagram of an exemplary computer system 200 is depicted wherein the teachings of the present invention may be practiced. As can be appreciated by those skilled in the art, the computer system 200 is represented in FIG. 2 in its functional aspects. An Operating System ("OS") 210 is operably provided in the computer system 200 to control the information flow associated therewith. The OS 210 may be a Disk Operating System ("DOS") or a Network Operating System ("NOS") such as, for example Windows NT® or NetWare®, as may be appropriate depending upon whether the computer system 200 is arranged in a network configuration.

The OS 210, moreover, is operable with at least a conventional channel communication interface such as, for example, the SCSI interface standard described above. The exemplary OS 210 may further be provided with such functional structures that would enable interoperability with conventional network communication protocols such as, for example, the Internet Protocol ("IP").

Continuing to refer to FIG. 2, the exemplary OS 210 communicates with an OS-compatible channel or network communication protocol/interface 215 via an upper_level_ communication path 230. It should be appreciated that the upper_level_communication path 230 in the functional block representation of the exemplary computer system 200 may encompass such OS-software structures as communication protocol drivers, for example, the SCSI protocol drivers or IP protocol drivers. The exemplary OS 210 and the OS-compatible interface/protocol 215 together constitute what will be henceforth referred to as an OS environment 250 in the computer system 200. Reference numeral 220 refers to a Fibre Channel ("FC") environment which may encompass a plurality of FC devices operable in accordance with the teachings of the present invention in addition to the known Fibre Channel Protocol ("FCP") architecture described below in further detail.

Still continuing to refer to FIG. 2, it should be understood that most Operating Systems including, for example, the OS 210, are not provided with the capability of communicating "directly" with the devices disposed in the FC environment 220. Therefore, in order to operably include and harness the benefits of the FC environment 220 in an exemplary computer system 200, a link path 225 is provided between the FC environment 220 and the OS-compatible communication interface 215. As will be appreciated by those skilled in the art upon reference hereto, providing the link path 225 in accordance with the teachings of the present invention between the FC environment 220 and the OS-compatible communication interface 215 facilitates dynamic address changing of the FC devices, which changing is transparent to the OS-compatible upper-level software structures.

Figure 3:
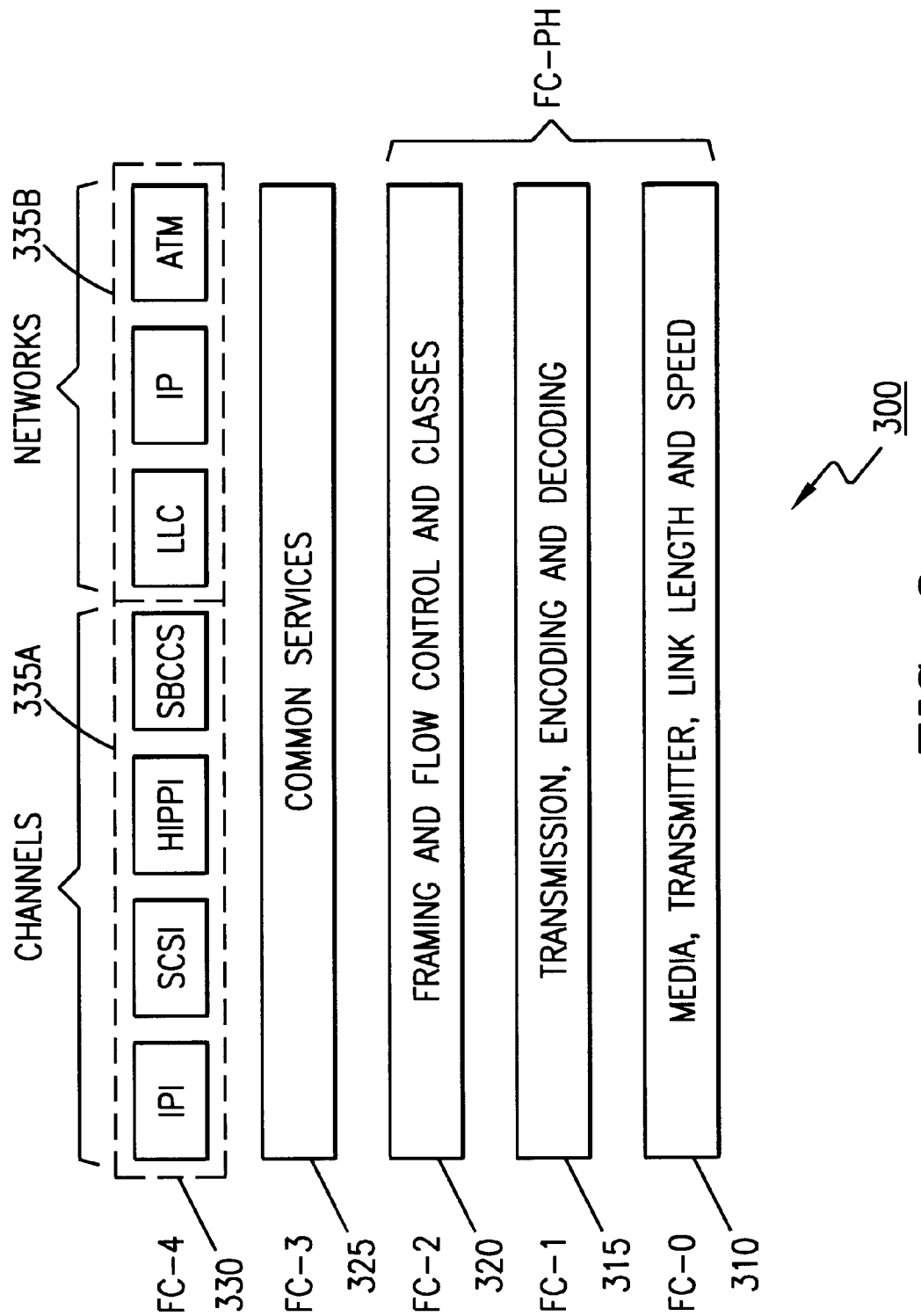
FIG. 3 depicts a diagrammatic representation of the Fibre Channel (FC) Protocol stack.

Referring now to FIG. 3, a diagrammatic representation of the FCP stack architecture is shown generally at 300. As can be readily appreciated, the FCP architecture is structured as a hierarchical set of protocol layers, much like the Open Systems Interface ("OSI") stack. The three bottom layers of the FC stack (layer 310, labeled as FC-0, through layer 320, labeled as FC-2) form what is known as the Fibre Channel Physical Standard ("FC-PH"). This Standard defines all the physical transmission characteristics of a Fibre Channel environment including, for example, the FC environment 220 (shown in FIG. 2). The remaining layers (layer 325, labeled as FC-3 and layer 330, labeled as FC-4) handle interfaces with other network protocols and applications. Unlike the existing Local Area Network ("LAN") technologies such as Ethernet and Token Ring, FC keeps the various functional layers of the stack 300 physically separate. As can be appreciated, this physical separation enables implementation of some stack functions in hardware and others in software or firmware.

The layer 310, FC-0, is the lowest functional layer of the FC architecture and describes the physical characteristics of the link connections among the plurality of FC devices disposed in the FC environment 220 (shown in FIG. 2). FC-0 supports a basic rate of 133 Mbaud, the most commonly used speed of 266 Mbaud, as well as 531 Mbaud and 1.062 Gbaud. However, because of the overhead involved in establishing and maintaining link connections, the actual data throughput is somewhat lower: 100 Mbit/s for 133 Mbaud, 200 Mbit/s for 266 Mbaud, 400 Mbit/s for 531 Mbaud, and 800 Mbit/s for 1.062 Gbaud. Further, FC-0 supports a wide range of physical cabling, including single-mode or multimode fiber-optic cable, coaxial cable, and shielded twisted pair ("STP") media. Each of these cabling elements supports a range of data rates and imposes specific distance limitations, but FC can mix all of them within the same FC environment such as the FC environment 220 shown in FIG. 2. For instance, single-mode optical fiber could be used for distances up to 10 km; multimode fiber, at 200 Mbit/s, could be used for distances up to 2 km; and STP, which supports 100 Mbit/s, may be used for up to 50 meters.

The layer 315, FC-1, defines the transmission protocol, including the serial encoding and decoding rules, special characteristics, and error control. FC-1 uses an 8B/10B block code, where every 8 data bits are transmitted as a 10-bit group with two extra bits for error detection and correction, known as disparity control. The 8B/10B scheme supplies sufficient error detection and correction to permit use of low-cost transceivers, as well as timing recovery methods to reduce the risk of radio-frequency interference and ensure balanced, synchronized transmissions.

The third layer of the FC-PH, layer 320, FC-2 describes how data is transferred between the FC devices, each FC device being disposed at a "Node," and includes the definition of the frame format, frame sequences, communications protocols, and service classes. The basic unit of data transmission in Fibre Channel is a variable-sized frame. Frames can be up to 2,148 bytes in length, comprising a payload of up to 2,048 bytes; 36 bytes of overhead that provides framing, source and destination port addressing, service type, and error detection information; and up to 64 bytes of additional optional overhead for other miscellaneous information about the user data, that is, the payload. A single higher layer (that is, the upper layers in the stack 300) protocol message may be larger than a frame's payload capacity, in which case, the message will be fragmented into a series of related frames called a sequence.

Continuing to refer to FIG. 3, FC-2 layer can be appreciated as the main "workhorse" of the FCP stack 300. It frames and sequences data from the upper layers (layers 325 and 330) for transmission via the FC-0 layer; it accepts transmissions from the FC-0 layer and reframes and resequences them, if necessary, for use by the upper layers 325 and 330. In addition to defining full duplex transmission path between two nodes, the FC-2 layer also provides essential traffic management functions, including flow control, link management, buffer memory management, and error detection and correction. An important feature of the FCP stack 300 is that the FC-2 layer defines four classes of service to meet a variety of communication needs. Class 1 Service defines hard-wired or circuit-switched connections that are dedicated, uninterruptible communication links. This service provides exclusive use of the connection for its duration (sometimes called a "selfish connection") . Class 1 Service is designed for time-critical, "non-bursty" dedicated links, such as those between two supercomputers. Class 2 Service is a connectionless, frame-switched transmission that guarantees delivery and confirms receipt of traffic. Like conventional packet-switching technologies such as frame relay, Class 2 switching is performed on the FC data frame rather than on a connection. No dedicated connection is established between the nodes; each frame is sent to its destination over any available route. When congestion occurs in Class 2 traffic, the frame is retransmitted until it successfully reaches its destination. Class 3 Service defines one-to-many connectionless frame-switched service that is similar to Class 2 Service, except that it has no delivery guarantee or confirmation mechanism. It can be appreciated that Class 3 transmissions are faster than Class 2 transmissions because they do not wait for confirmation. But if a transmission does not arrive at its destination, Class 3 Service does not retransmit. This service is most often used for real-time broadcasts that cannot wait for acknowledgment but are not sufficiently time-critical to warrant Class 1 Service. It is also used for applications that can tolerate lost frames. Class 4 Service is a connection-based service that offers guaranteed fractional bandwidth and guaranteed latency levels.

The FC-3 layer, layer 325, provides a common set of communication services of higher layer protocols above the FC-PH level. These additional services may include, for example, mechanisms for multicast and broadcast data delivery, "hunt" groups wherein more than one target node can respond to a given initiator node, and multiplexing multiple higher layer protocols and the FC-PH.

The top layer, layer 330, of the FCP stack 300 is the FC-4 layer. It defines the higher layer applications that can operate over an FC infrastructure such as, for instance, the FC environment 220 shown in FIG. 2. The FC-4 layer provides a way to utilize existing channel and network protocols over Fibre Channel without modifying those protocols. Accordingly, the FC-4 layer acts like a protocol convergence layer so that the FC node appears to provide the exact lower-layer transport services that the higher-layer channel or network protocol requires. This convergence function may require that the FC-4 provide additional services such as buffering, synchronization, or prioritization of data. It can be appreciated that the FC-4 functionality is encompassed in the link path 225 disposed between the FC environment 220 and the OS-compatible interface 215 of the exemplary computer system 200, shown in FIG. 2.

Still continuing to refer to FIG. 3, various FC-4 level mappings have been specified for a number of higher layer channel and network communication protocols, including: Intelligent Peripheral Interface ("IPI"); SCSI; High-Performance Parallel Interface ("HIPPI"); Single Byte Command Code Set ("SBCCS"); Logical Link Control ("LLC"); IP; and Asynchronous Transfer Mode ("ATM") Adaptation Layer ("AAL") However, as indicated hereinabove, these mappings do not provide for dynamic address changing of the FC devices that are disposed in the FC environment 220 (shown in FIG. 2) is operable in accordance with the FCP stack 300.

Figure 4A:
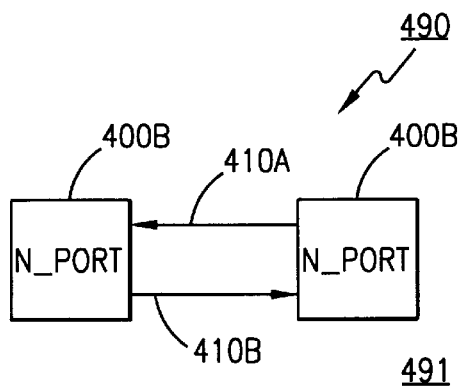
FIGS. 4A–4C depict block diagrams of the three topological configurations available for Fibre Channel Nodes.
Figure 4B:
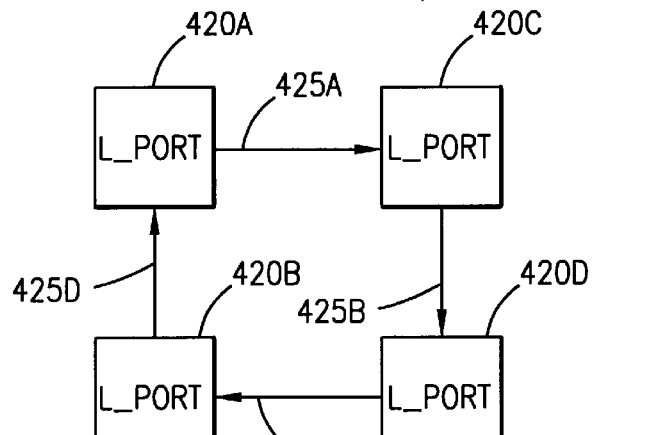
Figure 4C:
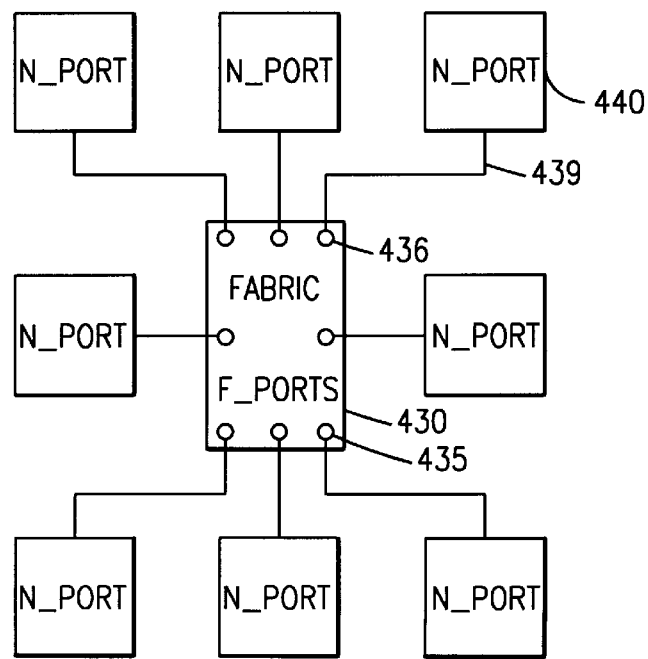

Referring now to FIGS. 4A–4C, three exemplary topological configurations are shown, generally at 490, 491, and 492, respectively, into which the FC Nodes may be arranged. It should be understood that all three topologies are fully interoperable and the teachings of the present invention may be practiced in any appropriate combination thereof.

An FC Node is an entity, system, or device that has the capability to process the ULPs, FC-3, and some of the FC-2 functions. A Node may contain one or more Ports, commonly known as Node Ports or N_Ports. An N_Port is a hardware entity within a Node that supports the FC-PH. It may act as an originator (that is, an initiator), or a responder (that is, a target), or both. Hereinafter, the terms nodes, devices and ports will be somewhat interchangeably used for the purposes of the present invention.

Reference numeral 490 refers to a point-to-point topology which utilizes communication links 410A, 410B to provide a full duplex transmission path between any two FC Nodes, denoted here as N_Ports 400A and 400B. This connection topology provides the maximum possible bandwidth and lowest latency since there are no intermediate devices/Nodes.

Reference numeral 492 refers to a switched fabric topology where each FC device or node (N_Port) is connected to an F_Port that is part of a fabric, for example fabric 430, and receives a non-blocking data path to any other connection on the fabric. The fabric 430 may be a switch or series of switches and is responsible for routing between Nodes, error detection and correction, and flow control. The operation of the fabric 430 is independent of the higher layer communication protocols, largely distance-insensitive, and may be based on any technology.

Communication paths, for example, path 437, provide a bidirectional connection between a Node, N_Port 440 and a fabric port (F_Port) 436. The switched fabric topology 492 provides the maximum connection capability and total aggregate throughput of all the three FC topologies. It may be appreciated that the switched fabric topology 492 provides the capability to interconnect large number of systems; to sustain high bandwidth requirements; to match data rates between connections of different speeds; and to match different cabling elements.

Reference numeral 491 denotes a loop topology known in the art as an Arbitrated Loop ("AL"), operable with a connection standard referred to as the FC-AL standard. The loop topology 491 interconnects a plurality of FC devices or Nodes (denoted as loop ports or L_Ports) such as, for example, L_Ports 420A through 420D, via unidirectional links, for example, links 425A through 425D. Thus, this connection arrangement enables each device to use the loop topology 491 as a point-to-point connection between a sender and a receiver, irrespective of, any intermediate devices disposed therebetween which merely act as "repeaters."

The arbitrated loop 491 provides a low-cost means of attaching multiple devices without the need for hubs or switches. Although only four L_Ports are shown in FIG. 4B, the loop provides shared bandwidth for up to 127 L_Ports. Each L_Port requests use of the loop when it needs to communicate with another port; if the loop is free, the requesting port sets up a bidirectional connection with the destination port. The loop protocol permits an L_Port to continuously arbitrate to access the transmission medium to transmit to another L_Port; a fairness algorithm ensures that no L_Port gets blocked from accessing the loop. Once a connection is established, it can then deliver any class of service appropriate to the traffic between the two L_Ports.

As is known in the art, only one pair of L_Ports may communicate at one time. When these L_Ports relinquish control of the loop, another point-to-point connection between two L_Ports may be established. Further, the entire loop may be attached, in turn, to a FC switch fabric port via what is known as an FL_Port, or directly to a single host system via an NL_Port.

Because the presently preferred exemplary embodiment of the present invention encompasses an FC-AL topology, such as the loop topology 491, the general operation of this nodal configuration will be described in greater detail hereinbelow.

It is known that the FC-AL standard allows each FC device to negotiate for an Arbitrated Loop Physical Address (AL_PA). Moreover, while participating on an Arbitrated Loop, the FC devices must log in to each other before commencing a loop transaction. If a device not logged in to another device, it will discard any frames it receives from that device until it is logged in. Since an initiator or driver must be able to manage the target device with which it is communicating, the initiator keeps track of an FC-specific identity triplet for that target device. This FC-specific ID triplet comprises a target's Node_Name, its Port_Name, and its AL_PA. While the AL_PA is dynamically assigned upon a loop reset, the Node_Name and Port_Name are formed from the device's unique World_Wide_Name.

When the devices come up onto an Arbitrated Loop upon a reset, they configure their AL_PAs in one of three ways: via a Soft Address scheme, a Preferred Address scheme, or a Hard Address scheme. In a Soft Address scheme, the device does not care what AL_PA it is assigned. Rather, it simply accepts the first free AL_PA available.

In a Preferred Address scheme, the FC device would like to be assigned a particular AL_PA. However, if a desired AL_PA is unavailable for some reason, it will accept whichever AL_PA that is free and available. For example, after a device is assigned a specific AL_PA for the first time upon "global" system initialization following the loading of the OS, that device will continue to request for that AL_PA upon subsequent loop resets. However, once this device goes off-line from the Arbitrated Loop, it will lose its ability to "prefer" that AL_PA and must resort to accepting the first free AL_PA that is available.

In a Hard Address scheme, the FC device can only operate at a particular AL_PA. According to the Loop Initialization Protocol ("LIP") in the FC-AL Standard, which handles the configuration of the AL_PAs, this method of address configuration takes precedence over the first two methods, namely, the Soft Address and Preferred Address schemes.

After all AL_PA assignment issues have been resolved, the FC-devices that act as initiators send out to all valid loop addresses a plurality of what are known as Link Service Frames which comprise, among other things, the LOGIN ("PLOGI") Frames, in order to discover what devices are on the Arbitrated Loop. If a device accepts the LOGIN Frames from an initiator, it will respond by transmitting in turn one or more ACKNOWLEDGMENT ("ACK") Frames to the initiator. Then, responsive to these ACK Frames, a structure in the initiator known as the Fibre Channel Manager ("FCMNGR") will transmit a PROCESS LOGIN REQUEST ("PRLI") to the responding device which, subsequently, identifies itself as being a target, an initiator, or both.

The information comprising a device's ID triplet and additional information such as Device_Type and Device_Function (described below) is typically passed to the FCMNGR in a driver or initiator via a LOG Function that is a constituent element of the FC-AL standard. The information in the LOG Function is mapped in accordance with the teachings of the present invention to a link element pertaining to a higher-level OS-compatible interface in order to provide for hot-plugging a device without a system reboot or without having to incur some specialized software overhead to "quieten" the loop.

Figure 5:
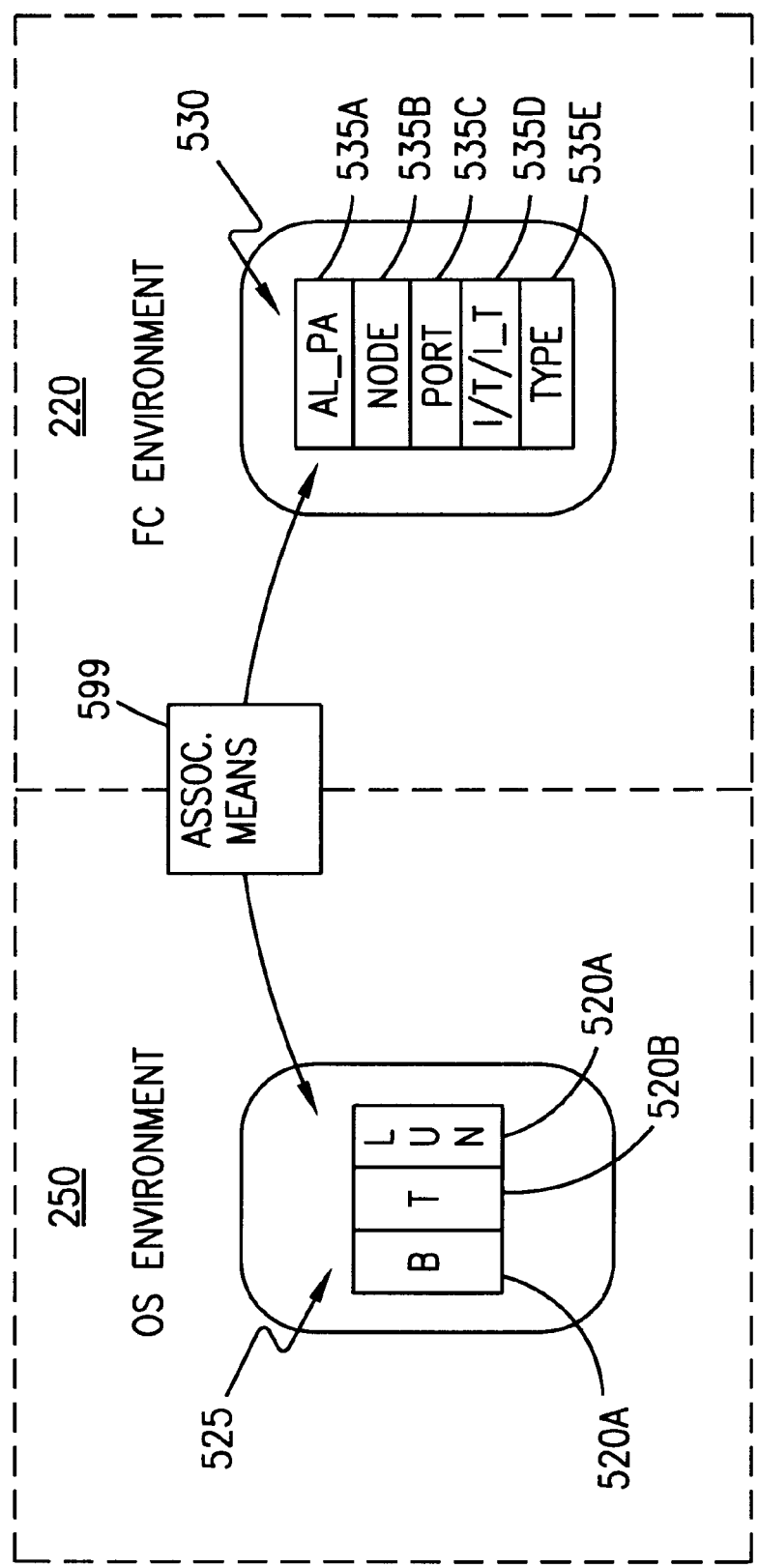
FIG. 5 illustrates an exemplary embodiment of the mapping method in accordance with the teachings of the present invention.

Referring now to FIG. 5, therein is depicted an exemplary embodiment of the mapping method in accordance with the teachings of the present invention, wherein an FC-specific LOG Function information structure 530 is uniquely mapped, via association means 599, to a link element 525 that is interpretable by a higher-level OS-compatible interface standard. For instance, in a SCSI environment, this link element 525 comprises a BUS_TARGET_LUN nexus that has been previously described in reference to FIG. 1. The information structure 530 relating to an FC device preferably comprises its AL_PA 535A, its unique Node_Name 535B and Port_Name 535C, Device_Function 535D to specify if it is an initiator, target, or both, and Device_Type 535E to specify if the device is an array or a Direct Access Device ("DAD"), or the like. In accordance with the teachings of the present invention, each link element associated with an information structure relating to a specific FC device is preferably required to be unique during the run time of the OS for a particular session.

It should be readily appreciated by those skilled in the art that by using the teachings of the present invention, an Operating System need not know that it is on a Fibre Channel Arbitrated Loop because the OS would use the unique link element 525 in conjunction with association means 599 to send upper-level commands to the FC devices. Furthermore, because of the uniqueness of the mapping between the link element 525 and the FC information structure 530, the OS need not be aware of subsequent changes in the constituent parts of the FC information structure 530 that may be required because of a configuration change in the FC environment 220 pursuant to an event such as, for example, hot-plugging involving device addition/deletion, device substitution, or whatever. The low-level software comprising the FCP architecture would be able to sense any configuration change in the FC environment 220 and it would make any necessary changes in the FC information structure 530 while the link element 525 "fixedly" points to the same during the run time of the OS irrespective of such changes. Association means 599 manages such low-level FC configuration changes by maintaining unique mapping relationships, creating new link elements, and terminating prior link elements, if necessary.

It should be understood that the innovative teachings of the present invention may be readily extendable to any mapping to a link element that is OS-compatible. For example, it can be appreciated that the FC information structure 530 is mappable to a unique OS-compatible IP link element. The OS, then, need only to issue IP-level commands in order to communicate with the FC devices on the Arbitrated Loop without having to keep track of dynamic changes in the loop addresses.

Figure 6:
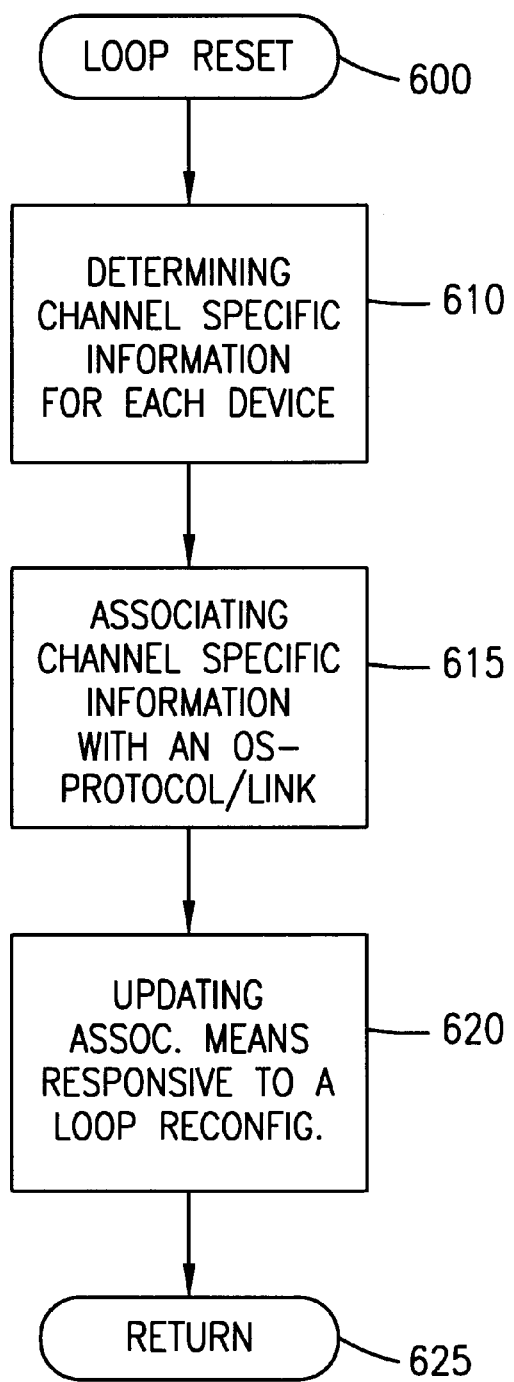
FIG. 6 depicts an exemplary flow diagram for a method of automatic dynamic loop address changing in accordance with the teachings of the present invention.

Referring now to FIG. 6, shown therein is an exemplary flow diagram for a preferred method of automatic dynamic loop address changing in accordance with the teachings of the present invention. Upon a loop reset 600, FC-specific information for each device on the Arbitrated Loop (such as the FC information structure 530, shown in FIG. 5) is determined in step 610. Preferably, this step may include executing a Loop Initialization Protocol step. Subsequently, this FC-specific information is associated with an OS-compatible link element, as shown in step 615. This association can be embodied in a number of ways. For example, suitable data tables with logical link pointers may be maintained in each initiator device on the Arbitrated Loop.

Responsive to a dynamic loop reconfiguration due to an event such as, for example, hot-plugging involving device deletion, device substitution, device addition, in combination with any of the address schemes described above, the FC-specific information structures associated with unique OS-compatible link elements are suitably updated. In addition, new link elements may be created, if necessary. These processes are consolidated in step 620.

Figure 7A:
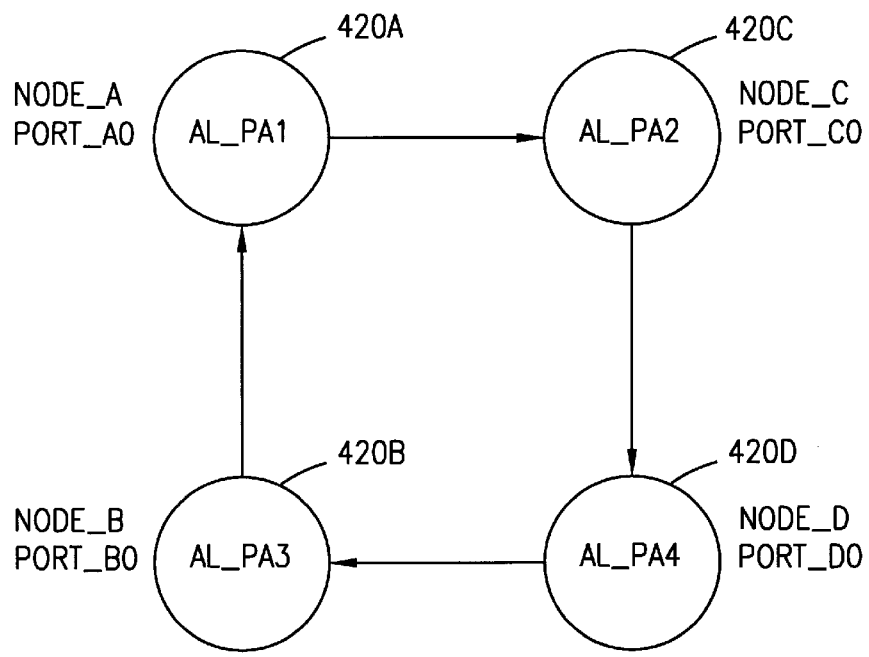
FIGS. 7A and 7B depict an exemplary embodiment where a loop address is dynamically changed in accordance with the teachings of the present invention upon introduction of a hard-coded device in the loop.
Figure 7B:
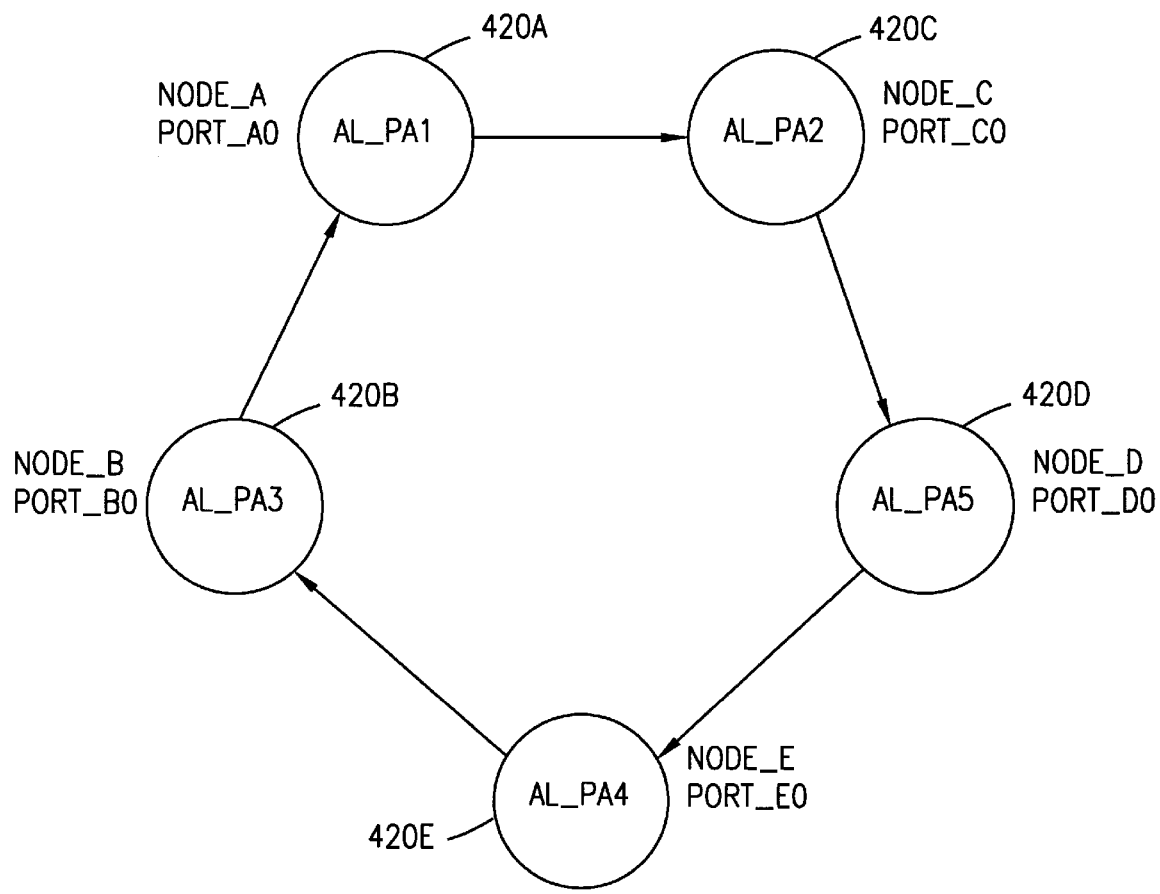

FIGS. 7A and 7B depict an exemplary embodiment where a new device 420E (Node_E) with a hard-coded address that is already occupied by a device 420 D (Node_D) is dynamically introduced into a 4-device Arbitrated Loop. FIG. 7A represents the loop configuration before the device 420E with hard-coded AL_PA4 and a World_Wide_Name comprising Node_E and Port_E0 is introduced. The initialized loop comprises a device 420A with AL_PA1 and the World_Wide_Name of Node_A and Port_A0; a device 420B with AL_PA3 and the World_Wide_Name of Node_B and Port_B0; a device 420C with AL_PA2 and the World_Wide_Name of Node_C and Port_C0; and a device 420D with AL_PA4 and the World_Wide_Name of Node_D and Port_D0. Further, it may be provided in this exemplary embodiment that devices 420A and 420B operate as initiators while devices 420C and 420D operate as targets. The FC-specific information structures corresponding to these four devices are mapped to, for example, such unique SCSI link elements as follows: For device 420A, it is mapped to a BUS_TARGET_LUN comprising 0_0_0; for device 420DB, it is mapped to a BUS_TARGET_LUN comprising 0_1_0; for device 420C, it is mapped to a BUS_TARGET_LUN comprising 0_2_0; and for device 420D, it is mapped to a BUS_TARGET_LUN comprising 0_3_0. As described hereinabove, these link elements will be presented to the upper level software structures that are present in the OS environment for proper commands and operation of the loop.

FIG. 7B represents the loop configuration after the device 420E with hard-coded AL_PA4 and a World_Wide_Name comprising Node_E and Port_E0 is introduced. While the FC-specific information structures corresponding to the devices 420A, 420B and 420C are unaffected, the FC-specific information structure corresponding to the device 420D is updated to reflect the fact that its physical address field now contains the first free and available address, for example AL_PA5, upon the execution of the Loop Initialization Protocol. In addition, a new link element having a BUS_TARGET_LUN comprising, for example, 0_4_0 will be created preferably in the association means contained in the two initiator devices, 420A and 420B, in order to correspond to the new, hard-coded device 420E. Thus, Node_E will be presented to the OS environment as a new device while Node_D would continue to be recognized a device that was already configured in the OS.

It should be appreciated that by handling FC devices dynamically in the manner described herein System Administrators would be able to add new devices to an Arbitrated Loop without disrupting system activity.

Although only certain embodiments of the apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for dynamically altering the loop address of a device on a Fibre Channel Arbitrated Loop (FC-AL) in a computer system, comprising the steps of:

determining an information structure related to said device upon a loop reset;

keeping track of said information structure as said device moves around said Fibre Channel Arbitrated Loop;

associating said information structure with a unique logical link element, said unique logical link element being operable with an Operating System for said computer system, said associating step being performed by association means; and updating said association means responsive to a change in said information structure.

2. The method as recited in claim 1, wherein said determining step comprises ascertaining an AL_PA, a Node_Name, a Port_Name, a Device_Type and a Device_Function, related to said device.

3. In a computer system operable with an Operating System (OS), the computer system having a Fibre Channel (FC) communication environment, which environment includes a plurality of FC devices, at least one of said FC devices being an initiator, a method for dynamically controlling the configuration of said plurality of FC devices, comprising the steps of:

determining an FC-specific information structure related to each of said plurality of FC devices;

associating said FC-specific information structure for each of said plurality of FC devices with a logical link element compatible with said Operating System, said associating step being effectuated by association means; and updating said association means responsive to a reconfiguration of said FC environment.

4. The method as recited in claim 3, wherein said determining step is performed by said initiator responsive to a reset.

5. The method as recited in claim 3, wherein said determining step comprises ascertaining a physical address for each of said plurality of FC devices.

6. The method as recited in claim 3, wherein said determining step comprises ascertaining a World_Wide_Name for each of said plurality of FC devices.

7. The method as recited in claim 6, wherein said ascertaining step comprises identifying at least one of a Port_Name and a Node_Name for each of said plurality of FC devices.

8. The method as recited in claim 3, wherein said determining step comprises ascertaining a device_type for each of said plurality of FC devices.

9. The method as recited in claim 3, wherein said associating step comprises creating a unique BUS_TARGET_LUN nexus for each of said plurality of FC devices.

10. The method as recited in claim 3, wherein said updating step comprises deleting a BUS_TARGET_LUN responsive to said reconfiguration of said FC environment.

11. The method as recited in claim 3, wherein said updating step comprises creating a new BUS_TARGET_LUN responsive to said reconfiguration of said FC environment.

12. The method as recited in claim 3, wherein said updating step comprises modifying said FC-specific information structure responsive to said reconfiguration of said FC environment.

13. In a computer system operable with an Operating System (OS), the computer system having a Fibre Channel (FC) communication environment, which environment includes a plurality of FC devices, at least one of said FC devices being an initiator, a system for dynamically controlling channel communication comprising:

means for determining FC-specific information related to each of said plurality of FC devices;

means for associating said FC-specific information for each of said plurality of FC devices with a logical link compatible with said Operating System; and means for updating said associating means responsive to a reconfiguration of said FC environment.

* * * * *